C. F. Hall.

Refitting Valves.

Nº 100,617.  Patented Mar. 8, 1870.

Witnesses,
Chas. Nida
Jno. E. Brooks

Inventor
Chas. F. Hall
per Munn & Co.

United States Patent Office.

CHARLES F. HALL, OF BROOKLYN, NEW YORK.

Letters Patent No. 100,617, dated March 8, 1870.

IMPROVED MACHINE FOR REFITTING CONICAL VALVES.

The Schedule referred to in these Letters Patent and making part of the same

*To all whom it may concern:*

Be it known that I, CHARLES F. HALL, of the city of Brooklyn, in the county of Kings, and State of New York, have invented a new and useful Improvement in Machinery for Refitting Conical Valves; and I do hereby declare that the following is a full, clear, and exact description thereof, which will enable others skilled in the art to make and use the same, reference being had to the accompanying drawing forming part of this specification.

This invention relates to improvements in machinery for refitting the valves of globe-valves, and has for its object to provide machinery having greater efficiency than any now in use for the purpose.

The invention consists in the improved construction, arrangement, and combination of parts, as will be hereinafter more fully described.

Similar letters of reference indicate corresponding parts.

Figure 1:
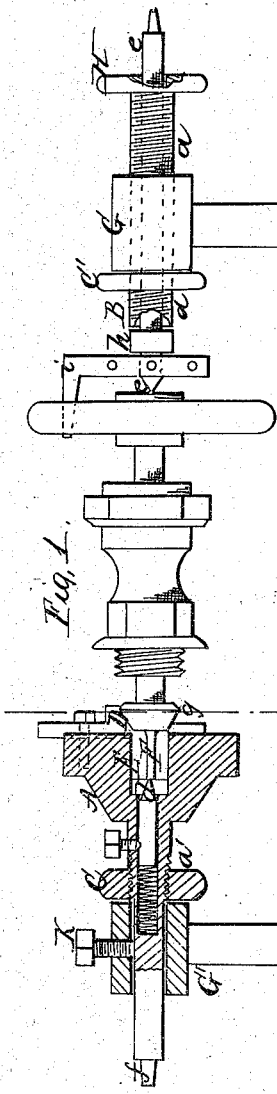
Figure 1 represents an elevation, partly in section, of a machine for fitting the valves, showing the arrangements of the milling-tool, and the tail-stock for feeding and securing at any position; also, the arrangement of the milling-tool for adaptation to fit "wing-valves."

In the machines now in use for refitting these valves and valve-seats the mills for the valves consist either of conical mills or sections of hollow cones, the sides of which converge at the axis, or so nearly so that only conical valves can be fitted in them. They are also arranged, both the stock of the mill for the valves and the reamer, so that they are dependent for the feed upon the pressure imparted by the operator in the lengthwise direction of the said stocks, when he turns them by the cranks applied to the square ends thereof.

It is impossible under this arrangement for the operator to so graduate the pressure at the finishing of the operation as not to leave across the faces of the valves or seats, the marks of the edges of the cutters, or to so gradually lessen the depth of the cut as to terminate the cutting smoothly and truly; consequently, the surfaces are often chattered and grooved to such an extent that the valves will leak.

To obviate this difficulty, I have provided the screw-threads *a* on the stocks of both the milling-tools A and the tail-stock B; also, the feeding and setting nuts *c c'*.

The valves to be fitted are suspended upon the points *d* and *e* in the usual way, and pressed against the cutters of the mill A. In this example I have arranged both the spindles for feeding and revolving as may be preferred.

When the tool A is revolved, (which may be done by a crank on the square shank *f*,) it is fed up to the valve *g* by the nut *c*, which may be gradually turned by the operator until very nearly the desired amount or part of the valve has been turned off. Then, allowing the nut to remain fixed in its position and the tool A to continue its revolution, the valve will be smoothly finished, with the removal of only a slight remaining or additional portion thereof.

The milling-tool holder A carries tools D or tool-stocks D, which are adjustable to or from the center, for valves of various sizes, and it is provided with a central recess, E, for the reception of the wings F of wing-valves.

The cutting-tools are formed to be adjusted for cutting down close to the point of junction of the wings with the valves.

The tail-stock B is screw-threaded on the exterior, and fitted to corresponding threads in the bearing *g*, and provided with a milled hand-wheel, H, or other device, for turning it to feed the spindle *e* forward. When it may be preferred to employ this mode of feeding instead of feeding the stock A, the latter is held from rotating in this case by the screw K.

The stock B is tubular, and supports a spindle, *e*, having a collar, *h*, against which the end of the hollow stock works.

The said spindle also carries a dog, *i*, detachably connected to it. This dog engages with the hand-wheel of the valve-stem, to either hold it or carry it around in turning.

The jam-nut *c'*, on the stock B, screwing up against the bearing G, secures the stock firmly in the required position when the feeding has been done by the stock B, and arrested to hold the parts for finishing off the face of the valve, or when it is to be held rigidly and the feeding done by the stock of the mill A.

The spindle *e* may be held against the action of the milling-head, when the latter is turned, by a set-screw arranged in any preferred way, or by any other suitable device.

Figure 2:
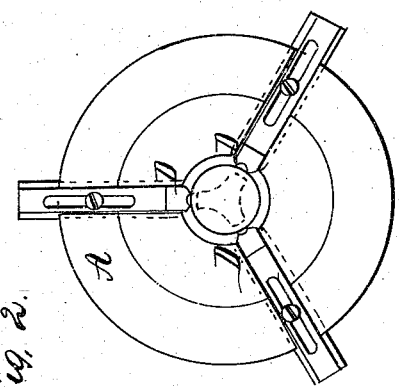
Figure 2 represents an enlarged face-view of the milling-tool.

The cutter-holders D are represented in figs. 1 and 2 as arranged for adjustment by hand, and to be secured by set-screws.

Having thus described my invention,

What I claim as new, and desire to secure by Letters Patent, is—

1. The combination of hollow screw-shaft B, threaded sleeve G, arm $i$, collared spindle $e$, and jam-nut $c'$, all arranged and operating together in the manner described.

2. The combination of head-stock A', having male thread $a$ on its shaft extension, and recess E, as shown, with threaded nut C, stationary sleeve G, and cutters D, all constructed and arranged as and for the purpose specified.

3. The construction and arrangement of the two devices above claimed, with respect to each other, in the manner shown and described, for the purpose of giving a feed in either direction at the will of the operator.

The above specification of my invention signed by me this 19th day of May, 1869.

C. F. HALL.

Witnesses:
 FRANK BLOCKLEY,
 O. L. TOPLIFF.